US007809874B2

(12) United States Patent
Meaney et al.

(10) Patent No.: US 7,809,874 B2
(45) Date of Patent: Oct. 5, 2010

(54) METHOD FOR RESOURCE SHARING IN A MULTIPLE PIPELINE ENVIRONMENT

(75) Inventors: Patrick J. Meaney, Poughkeepsie, NY (US); Michael Fee, Cold Spring, NY (US); Christopher M. Carney, Red Hook, NY (US)

(73) Assignee: International Business Machines Corporation, Armonk, NY (US)

( * ) Notice: Subject to any disclaimer, the term of this patent is extended or adjusted under 35 U.S.C. 154(b) by 784 days.

(21) Appl. No.: 11/425,398

(22) Filed: Jun. 21, 2006

(65) Prior Publication Data

US 2007/0300040 A1    Dec. 27, 2007

(51) Int. Cl.
G06F 13/14       (2006.01)
(52) U.S. Cl. ..................................... 710/242
(58) Field of Classification Search ................. 710/242, 710/119–121
See application file for complete search history.

(56) References Cited

U.S. PATENT DOCUMENTS

| | | | | |
|---|---|---|---|---|
| 4,541,043 A | * | 9/1985 | Ballegeer et al. ............ | 710/242 |
| 5,016,167 A | * | 5/1991 | Nguyen et al. .............. | 711/151 |
| 5,168,570 A | * | 12/1992 | Eckert et al. | |
| 5,307,477 A | * | 4/1994 | Taylor et al. ................. | 711/3 |
| 5,506,972 A | * | 4/1996 | Heath et al. ................. | 710/113 |
| 5,553,298 A | * | 9/1996 | Merryman et al. .......... | 718/104 |
| 5,710,891 A | * | 1/1998 | Normoyle et al. ........... | 710/119 |
| 5,860,017 A | * | 1/1999 | Sharangpani et al. ......... | 712/23 |
| 5,862,355 A | * | 1/1999 | Logsdon ..................... | 710/116 |
| 5,884,055 A | | 3/1999 | Tung et al. .................. | 395/307 |
| 5,961,631 A | * | 10/1999 | Devereux et al. ........... | 712/207 |

(Continued)

FOREIGN PATENT DOCUMENTS

EP              992896 A1 *  4/2000

OTHER PUBLICATIONS

Resource Sharing and Pipelining in Course-Grained Reconfigurable Architecture for Domain-specific Optimization, Y. Kim et al., Proceeding of the Design, Automation and Testin Europe Conference and Exhibition, 2005, pp. 1-6.

(Continued)

*Primary Examiner*—Paul R Myers
(74) *Attorney, Agent, or Firm*—Lynn L. Augspurger; John E. Campbell

(57) ABSTRACT

Disclosed is a method and apparatus for arbitration between multiple pipelines over shared resources for an SMP computer system. The computer includes logic to defer arbitration until later in the pipeline to help reduce latency to each pipeline. Also, introduced is the concept of retry tags for better priority to avoid lock-out. The system also includes round-robin tokens to manage rejected requests to allow better fairness on conflicts. While the processing logic employed specifically applies to cross-interrogation, the logic can be extended to other common resources. The illustrated SMP computer system also has self-correcting logic to maintain good round-robin tokens.

20 Claims, 8 Drawing Sheets

U.S. PATENT DOCUMENTS

| | | | | |
|---|---|---|---|---|
| 5,987,549 | A | * | 11/1999 | Hagersten et al. ........... 710/107 |
| 6,151,655 | A | * | 11/2000 | Jones et al. ................. 710/244 |
| 6,430,640 | B1 | * | 8/2002 | Lim ........................... 710/200 |
| 6,493,784 | B1 | * | 12/2002 | Kamimura et al. .......... 710/309 |
| 6,704,820 | B1 | * | 3/2004 | Walker et al. ............... 710/242 |
| 6,810,457 | B2 | * | 10/2004 | Hagiwara .................. 710/242 |
| 6,950,892 | B2 | * | 9/2005 | Bell et al. ................... 710/120 |
| 6,983,461 | B2 | * | 1/2006 | Hutchison et al. ........... 718/104 |
| 7,073,004 | B2 | * | 7/2006 | Arimilli et al. .............. 710/200 |
| 7,124,224 | B2 | * | 10/2006 | Tu et al. ..................... 710/200 |

OTHER PUBLICATIONS

An Open Architecture for Next-Generation Telecommunication Services, G. Bond et al., ACM Transactions on Internet Technology, vol. 4, No. 1, Feb. 2004, pp. 83-123.

Design and Implementation of a Parallel Pipe, J. Karges et al., pp. 68-94.

Query Evaluation Techniques for Large Databases, G. Graefe, ACM Computing Surveys, vol. 25, No. 2. Jun. 1993, pp. 75-170.

* cited by examiner

FIGURE 1 - PRIOR ART
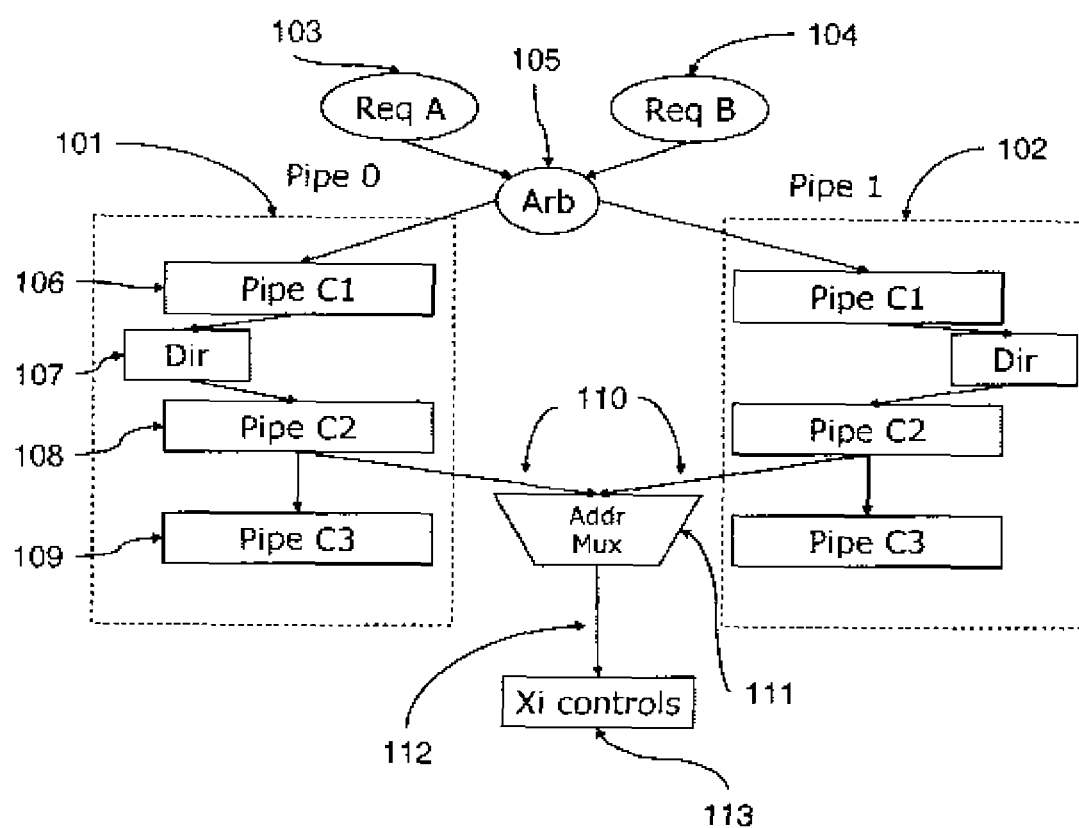

FIGURE 2 - PRIOR ART

| Pipe 0 | Pipe 1 | Result |
|--------|--------|--------|
| Non-XI | Non-XI | Both – No Reject |
| Non-XI | XI | Both – No Reject |
| XI | Non-XI | Both – No Reject |
| XI | XI | •Choose one pipe operation<br>•Deny other pipe operation<br>•May use round-robin token<br>•Decision is made before operation is allowed in a pipeline |

FIGURE 4

| Pipe 0 | Pipe 1 | Result |
|--------|--------|--------|
| Non-XI | Non-XI | Both - No reject |
| Non-XI | XI | Both - No reject |
| XI | Non-XI | Both - No reject |
| XI | XI | Self-reject one pipe operation after it has started. The other is allowed to proceed and use the common resource. |

FIGURE 6

| Current Pipe Req | Other Pipe Req | Prev Token | Next Token | Result |
|---|---|---|---|---|
| Non-XI | Non-XI | X | Same | Both - No reject |
| Non-XI | XI | X | Same | Both - No reject |
| XI | Non-XI | X | Same | Both - No reject |
| XI | XI | 0 | 1 | Self-reject |
| XI | XI | 1 | 0 | No reject |

FIGURE 7

| Current Pipe Retry Tag | Other Pipe Retry Tag | Current Pipe Req | Other Pipe Req | Prev Token | Next Token | Result |
|---|---|---|---|---|---|---|
| x | x | Non-XI | Non-XI | X | Same | Both - No reject |
| x | x | Non-XI | XI | X | Same | Both - No reject |
| x | x | XI | Non-XI | X | Same | Both - No reject |
| 0 | 1 | XI | XI | X | Same | Self-reject |
| 1 | 0 | XI | XI | X | Same | No reject |
| 0 | 0 | XI | XI | 0 | 1 | Self-reject |
| 0 | 0 | XI | XI | 1 | 0 | No reject |
| 1 | 1 | XI | XI | 0 | 1 | Self-reject |
| 1 | 1 | XI | XI | 1 | 0 | No reject |

METHOD FOR RESOURCE SHARING IN A MULTIPLE PIPELINE ENVIRONMENT

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to symmetrical computer systems, and particularly to a method of sharing resources of a computer system between multiple pipelines without incurring the overhead of cross-arbitration prior to gaining pipe priority.

2. Description of Background

In an SMP computer, such as the IBM® z Series® of mainframe computer systems manufactured by IBM it is vitally important to maintain high levels or performance, while optimizing for timing and circuit area to take advantage of density improvements. In order to accomplish this, many portions of the machine use pipelined resources.

In order to solve various timing/floorplanning issues, pipelines are often replicated and partitioned by using address/data steering techniques (e.g. using address bits), often using parallel pipelines. Normally these pipelines each use dedicated resources and the arbitration can occur independently within a pipeline.

However, there are times when multiple pipelines need to share common resources. Common resources can be shared in a computer having an added shared queue to the common resources and having operations which exit each of the existing pipelines to be queued for the common resource. This can cost considerable queuing area resources to handle the cases when both pipelines each need the common resource for many consecutive cycles. Although this need for the common resource can be rare, the need has to be addressed and the logic to handle this can be complex.

Another way to handle this would be to build extra arbitration into each pipeline to avoid the case where more than one pipeline can contend for the same common resource. This involves each pipeline being aware of the requests to the other pipelines and determining which operations can be released such that there would be no conflicts in the common staging of the pipelines. This has an advantage that there is little extra queuing area because the pipeline queues will hold any requests that have a conflict. Since the conflicts are relatively rare, there is no performance degradation of the seldom blocking of operations.

The disadvantage of this extra arbitration at the top of each pipeline is that the timing/latencies of cross-connecting the pipe requests for arbitration can hurt performance/timing. This increased latency would be incurred by ALL requests to the pipelines. This extra arbitration approach has a negative impact to performance.

SUMMARY OF THE INVENTION

The SMP computer system in accordance with our invention and the described embodiments doesn't have the disadvantages mentioned above and have additional advantages. We have provided an SMP computer system with its pipelines having a post-arbitration reject step in each pipeline. Whenever there is a resource conflict within a pipeline after arbitration, a reject is issued to re-queue the request that had a conflict. Once the resource is free, the request can vie for priority back into the pipeline.

In the case of a common resource conflict, there is logic in each pipeline to reject the current pipeline operation. The reject point in the pipeline allows for the retry of the operation without any destructive effects. Also, other operations in the pipeline continue without disruption.

An advantage in rejecting the operation after arbitration results from the fact that both the complexity and latency of the arbitration logic are reduced. This is important because the arbitration is involved in every operation and can affect the performance dramatically. However, in accordance with our embodiments rejecting later in the pipeline can be done in parallel to real pipeline operations, so there is no loss of direct performance (other than the minor effect on the rejected operation itself).

Another aspect of the invention is provides self-arbitration into the individual pipelines to minimize exchange of pipeline information. This is accomplished with replicated logic for the self-arbitration.

Another aspect of the invention allows later, more accurate information to look for conflicts. For instance, in the prior art, at arbitration time, if two operations have the "potential" of conflict, one would need to be rejected. In the illustrated preferred embodiment, the probability that two cache line operations both miss on the same cycle in the two pipes is rare. So, once the conflict information is known, the reject may not be necessary because only one (or no) requesters may even need the common resource.

Another aspect of the invention is the use of a retry tag so rejected operations can get higher priority on subsequent attempts to avoid lock-out conditions. There is also a round-robin toggle/token latch that allows more fairness between pipes.

On a retry following a reject, some of the advantages of the earlier pipe pass can be leveraged. For instance, if the hit/miss or cache compartment information is available, the information can be provided on the subsequent pipe pass.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution which is faster, requires less priority complexity/logic, requires less cross-coupling, and is simpler. The conflict resolution is deferred to a portion of the pipeline that has less timing constraints so the critical priority can be used to focus on real system performance. Because the conflict case (in this case the cross-interrogation of processors) is rare, there is no significant performance loss, especially, since using the priority logic, a critical path in the system, to determine the best non-conflict candidates could hurt frequency.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 1 illustrates an example of Prior Art multiple-pipeline arbitration for cross-interrogation of addresses.

FIG. 2 illustrates a truth table of the Prior Art arbitration logic

FIG. 4 illustrates a truth table of the arbitration logic element 310 of FIG. 3.

FIG. 6 illustrates an alternative truth table of the arbitration logic 310 of FIG. 3 with round-robin toggle latch.

FIG. 7 illustrates still another alternative truth table of the arbitration logic 310 of FIG. 3 with retry arbitration and round-robin token support.

The detailed description explains the preferred embodiments of the invention, together with advantages and features, by way of example with reference to the drawings.

DETAILED DESCRIPTION OF THE INVENTION

Turning now to the drawings in greater detail, it will be seen that the prior art shown in FIG. 1 contains two pipelines, pipe 0, 101, and pipe 1, 102. There are requestors, Request A, 103, which needs to vie for priority into pipe 0, 101, and Request B, 104, which needs to vie for priority into pipe 1, 102. Separate from whatever pipe arbitration logic resides in each pipe, there is a centralized pipe arbiter, 105, which is used to grant or deny Requests into either or both pipes.

Within each pipe, there are numerous pipelined registers which represent different cycles within the pipeline. The registers are labeled pipe C1, 106, pipe C2, 108, and pipe C3, 109. Each pipeline may contain one or more resources, for example, the depicted cache directory, 107.

There is a common resource, an address mux, 111, used for selecting which pipe will send out a cross-interrogation address. The Pipe C2 cross-interrogation address buses, 110, are muxed onto the muxed output address, 112, which Is sent to the cross-interrogation controls, 113.

FIG. 2 depicts a truth table for the prior art. If either pipe 0 or pipe 1 is doing an operation that does not require a cross-interrogation, there is no conflict for the common resource. However, if both pipes have operations that may need the cross-interrogation logic, one of the operations must be cancelled while the other is allowed to continue. In the prior art, this decision is made at the input of each pipe.

Figure 3:
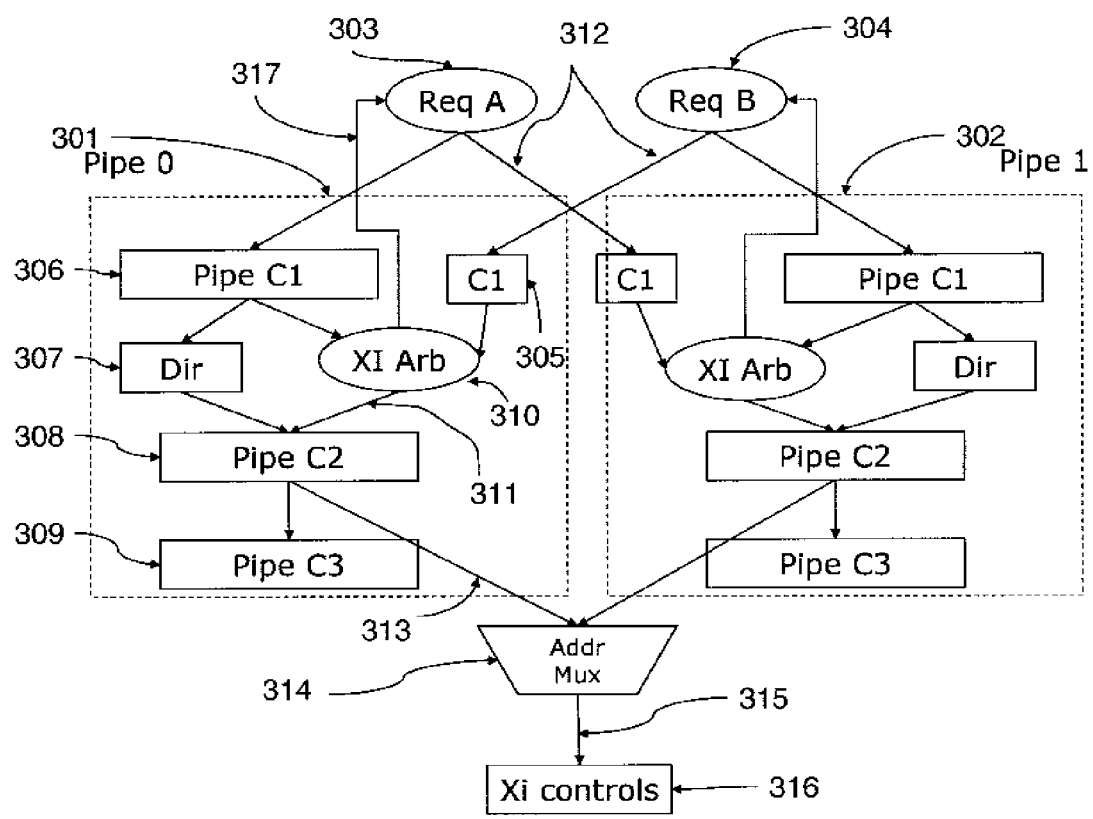
FIG. 3 illustrates an example of a SMP computer system incorporating our arbitration logic

FIG. 3 depicts the preferred embodiment of the SMP computer system. Unlike the prior art, the Requestor A, 303, and Requestor B, 304, go directly into their respective pipes, pipe 0, 301, and pipe 2, 302. However, a copy of the request from each requester is sent to the opposite pipe, 312, where it is staged into a register, 305. By avoiding this extra inter-pipe arbitration, 105, latency into the pipes is reduced.

The SMP computer system's cross-interrogation arbitration logic, 310, uses information from current pipe operation, 306 and remote pipe operation, 305, to determine if there is a resource conflict with the common address mux, 314. This arbitration can happen in parallel to other resource operations, like a search of the directory, 307. This helps to reduce overall arbitration latency.

In the event of a conflict, the cross-interrogation arbiter, 310, determines which requester should get the resource.

Various algorithms can be used for this. If the pipe 0 arbiter determines that the pipe 0 request should be rejected to allow pipe 1 to have access to the common resource, it issues a reject, 311, to the pipe c2 register, 308, thereby canceling the operation into the rest of the pipeline, 309. The pipe 0 arbiter also notifies the requestor that the operation was canceled, through the requestor reject signal, 317.

As mentioned earlier, there are various algorithms for arbiting of the common resource. FIG. 4 shows a method of arbiting for a common resource. When only one pipe has a request for the common resource, that resource is allowed to proceed. This is covered by the first three rows in the truth table. When there is a conflict, as depicted in the fourth row, one of the two pipes will reject its operation itself.

Figure 5:
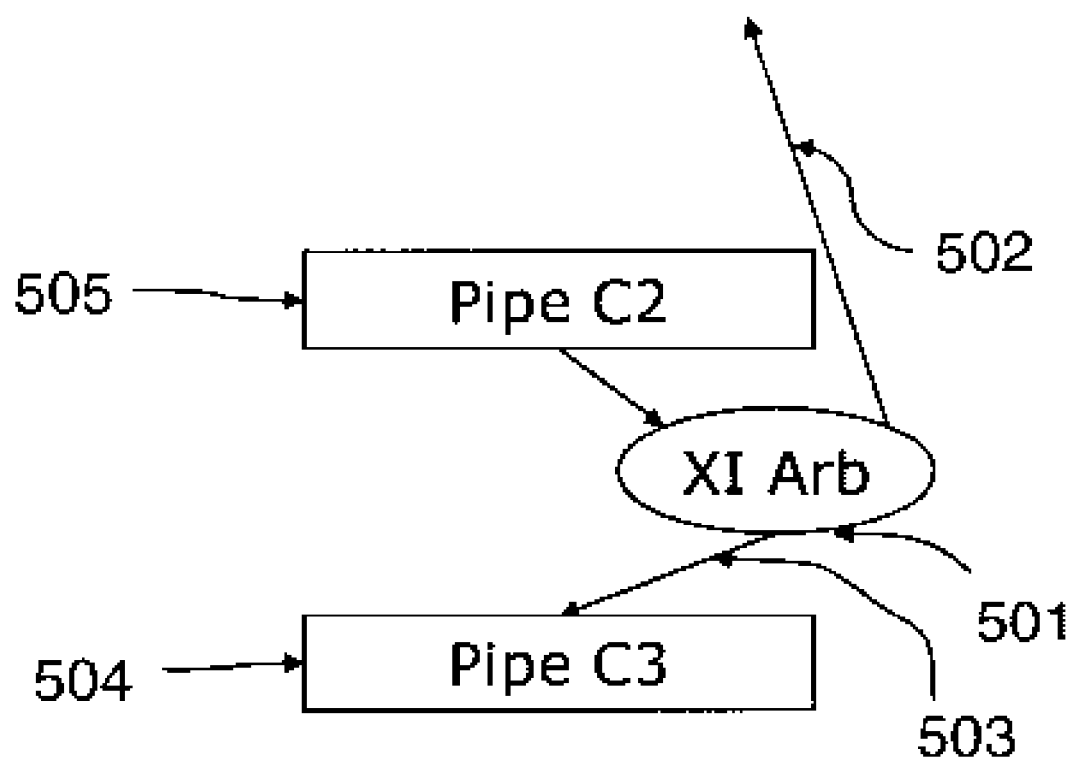
FIG. 5 illustrates an example of arbitration logic which uses the directory hit information.

Turning to FIG. 5, the arbitration logic can use more pipeline information to help improve reject rates. In this example, pipe C2 register, 505, contains cache hit information. This information feeds the cross-interrogation arbiter, 501, which can use the cache hit information to further determine whether to reject the current request or not. This is accomplished by blocking propagation, 503, of the current operation through the pipe, into pipe C3 register, 504. The cross-interrogation arbiter, 501, also notifies the requester that the operation was canceled, through the requester reject signal, 502.

FIG. 6 shows a truth table of another embodiment. In this example, like previous examples, non-conflicting cases are not rejected. A toggle latch exists in each pipe to control fairness. One pipe will have the token (toggle latch value=logic '1') while the other will not have the token (token latch value=logic '0'). While our truth tables illustrate the arbitration logic as tokens, it will be understood that our invention can be implemented with hardware where the token is implemented with a toggle latch. In either event, hardware or software implementation, when both pipes have a cross-interrogate operation, the pipe with the token will be allowed while the other pipe will be rejected. When this token gets used to break the tie, the token will be swapped (e.g. by toggling local toggle latches).

Another embodiment of the invention is depicted in FIG. 7. This version in FIG. 7 of our truth table shows a preferred embodiment. Turning to FIG. 7, there is a table showing the arbitration algorithm for this embodiment. As mentioned in previous examples, the first three rows relate to cases where there is no conflict for the common resource. This example has an additional retry tag associated with an operation. If an operation was rejected due to a cross-interrogate reject, the retry tag is set for subsequent attempts for priority. The fourth row shows that when the current pipe has a new XI operation and the other pipe is in the middle of a retry of an XI operation, the current pipe will reject itself because a retried operation has higher priority than a new operation. Likewise, the fifth row shows that when the current pipe is doing a retry of an XI operation and the other pipe is not, the current pipe will not be rejected. The remote pipe is responsible for rejecting itself. The only remaining cases for XI conflicts is when neither operation is a retry or when both operations are retries. Either way, the token (described in FIG. 6) will be used to break the tie and will be transferred to the other pipe.

Figure 8:
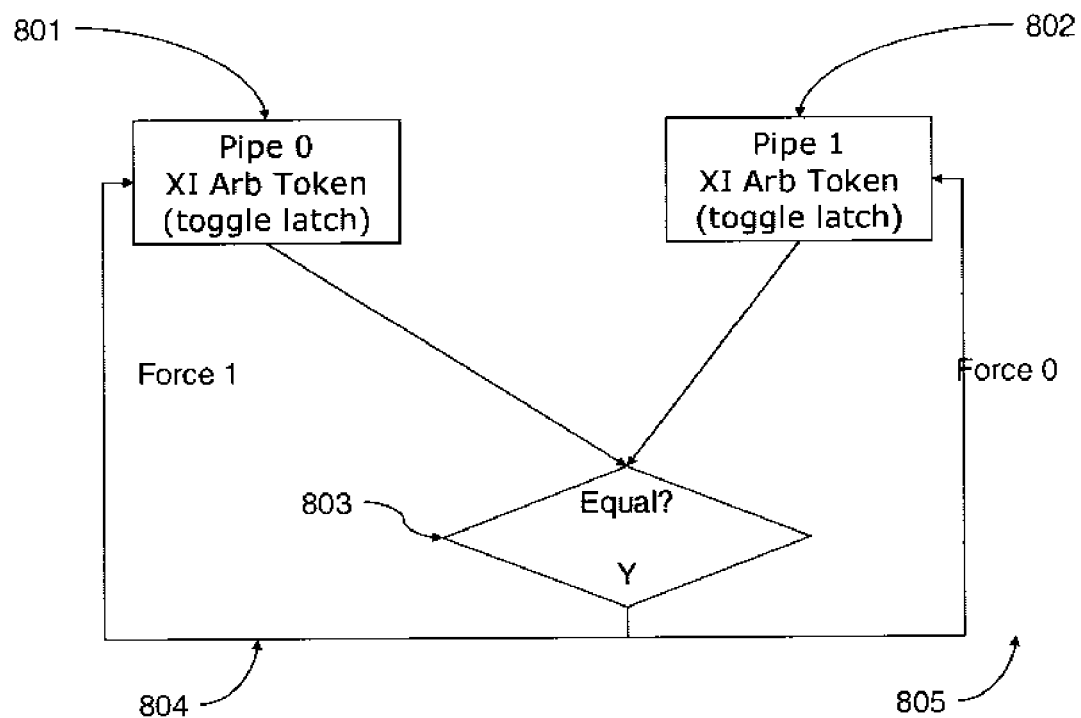
FIG. 8 illustrates how to correct tokens that get out of sync.

FIG. 8 also could be implemented for the arbitration logic of element 310 and shows a method for checking and correcting the tokens employing self-correcting logic to maintain good round-robin tokens. It is possible that the tokens that are used to break ties in the arbitration get out of sync with each other. Turning to FIG. 8, there illustrated the self checking and correcting logic for round robin tokens. There is a pipe 0 toggle latch, 801, and a pipe 1 toggle latch, 802. These feed token checking logic, 803, which compares the two toggle latches (tokens). If the two tokens match, the self-checking logic, 803, will set pipe 0 force 1 signal, 804, and will also set pipe 1 force 0 signal, 805, which will force the pipe 0 toggle to '1' and the pipe 1 toggle to '0'.

While the figures and details describe a two-pipe system, one skilled in the art can extend this concept to a multiple-requestor, multiple-pipe, multiple-resource system. Also, while pipe cross-interrogation logic was shown as an example of a common resource, there are many other common resources that can be substituted for the cross-interrogation logic.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method of resource arbitration for multiple pipelines with a shared resource of a Symmetric Multi-Processor (SMP) computer system comprising the steps of:
    arbitrating for priority with cross-interrogation arbiter logic within a pipeline of the multiple pipelines to reject a current cache line pipeline operation and to allow for the retry of the rejected current cache line pipeline operation without any destructive effects, while other operations in the pipeline continue without disruption; and
    determining, while arbitrating for priority, if a shared common resource of the Symmetric Multi-Processor (SMP) computer system is needed by a pipeline operation using information from said current cache line pipeline operation and a remote cache line pipeline to determine if there is a resource conflict with the shared common resource; and
    rejecting the said current cache line pipeline operation if there is a conflict within the current cache line pipeline with the said shared common resource of the Symmetric Multi-Processor (SMP) computer system.

2. A method in accordance with claim 1 further comprising the steps of:
    monitoring another operation in another remote cache line pipeline; and
    determining if said shared common resource is a common address mux needed by said another operation.

3. A method in accordance with claim 2 further comprising the steps of:
    retrying the rejected operation in the same current cache line pipeline after the operation has been rejected.

4. A method in accordance with claim 3 further comprising the steps of:
    when there has been a shared common resource conflict within a pipeline after arbitration and a reject is issued, the request that had a conflict is re-queued, and once the shared common resource is not in conflict and is free, the request vies for priority back into the same pipeline which rejects a current cache line pipeline operation.

5. A method in accordance with claim 4 further comprising the steps of:
    in the case of a conflict among pipelines for said common resource, logic in each pipeline provides for the rejection of a current pipeline operation at a reject point in the same pipeline which rejects a current cache line pipeline operation while allowing for the retry of the operation without any destructive effects and allowing, also, other operations in the same pipeline which rejects a current cache line pipeline operation to continue without disruption.

6. A method in accordance with claim 3 wherein:
    rejecting a current cache line pipeline operation is done in parallel to a real pipeline operations which continue without disruption.

7. A method in accordance with claim 3 wherein:
    using replicating logic for self-arbitration into the individual pipelines when a current cache line pipeline operation is rejected causes said cross-interrogation arbitration logic to minimize exchange of pipeline information.

8. A method in accordance with claim 2 wherein:
    when it is determined for each cache line pipeline operation that said shared common resource is needed by said another operation, a rejection is provided, but when it is determined that said shared common resource is not needed by said another operation normal operations continue.

9. A method in accordance with claim 1 wherein:
    rejecting the said pipeline operation if there is a conflict within the pipeline with the said shared common resource of the computer system employs a retry tag step allowing a rejected operation to subsequently get a higher priority on a subsequent retry attempt to avoid lock-out.

10. A method in accordance with claim 9 wherein:
    following said cross-interrogation arbiter logic using cache hit information to determine whether to issue a reject, cache information is provided on a subsequent pass retry.

11. A method in accordance with claim 9 wherein self-correcting logic is provided to maintain round-robin tokens including a token latch and toggling said token latch to arbitrate between multiple cache line pipelines using round-robin voting to determine if the local request has the highest priority for the shared common resource.

12. A method in accordance with claim 3 wherein a retry has the highest priority for the shared common resource.

13. A method in accordance with claim 3 employing self-correcting logic to maintain good round-robin tokens.

14. A method of resource arbitration for a request in a pipeline in parallel to requests in multiple pipelines with a shared common resource of a Symmetric Multi-Processor (SMP) computer system comprising the steps of:
- arbitrating for priority within a pipeline of the Symmetric Multi-Processor (SMP) computer system with cross-interrogation arbiter logic to reject a current cache line pipeline operation and to allow for the retry of the rejected current cache line pipeline operation without any destructive effects, while other operations in the pipeline continue without disruption; and
- determining if a shared common resource is needed by a request in the local current cache line pipeline;
- determining if a shared resource is needed by a request in a remote cache line pipeline;
- determining if the current cache line pipeline request is a retry of a rejected operation;
- determining if a remote cache line pipeline request is a retry of a rejected operation;
- determining if there is a conflict between the multiple pipes for the shared common resource of said Symmetric Multi-Processor (SMP) computer system;
- using retry indications to determine if the local current cache line request has the highest priority for the shared common resource;
- using round-robin voting to determine if the local current cache line request has the highest priority for the shared common resource in the case of a tie and retting a round robin token on a tie in the determination of a reject of the local current cache line pipeline operation;
- rejecting the local current cache line pipeline operation if it is not the highest in priority for the shared common resource; and
- notifying the local current cache line request has been cancelled through a requestor reject signal, and resetting the round-robin token if it was used in the current determination of a reject.

15. A method in accordance with claim 14 wherein a retry has the highest priority for the shared common resource.

16. A method in accordance with claim 14 wherein self-correcting logic to maintain good round-robin tokens is employed.

17. A method in accordance with claim 15 wherein when there is a tie and neither has a pipe retry then the tied one with a token will be the rejected operation in the tied ones cache line pipeline.

18. A method in accordance with claim 17 wherein when there is a tie and both cache line pipeline requests have a pipe retry cache line pipeline operation request, the tied cache line pipeline operation request without the token is rejected.

19. A Symmetric Multi-Processor (SMP) computer system having:
- multiple pipelines including at least a first current cache line pipeline and a second remote cache line pipeline and a first requestor and a second requestor which are copied directly into their respective pipelines of the Symmetric Multi-Processor (SMP) computer system;
- a coupling for a copy of a cache line pipeline operation request from each first requestor and a second requestor for sending said cache line pipeline operation request to the opposite cache line pipe, where it is staged into a register, said SMP computer system having cross-interrogation arbitration logic using information from said current cache line pipeline's operation and said remote cache line pipeline's operation to determine if there is a resource conflict with a common shared resource,
- said cross-interrogation arbitration logic arbitrating for priority with another cache line pipeline of the multiple pipelines to reject a current cache line pipeline operation and to allow for the retry of the rejected current cache line pipeline operation without any destructive effects, while other operations in the pipeline continue without disruption; and
- wherein said cross-interrogation logic while arbitrating for priority uses information from said current cache line pipeline operation and a remote cache line pipeline to determine if there is a resource conflict with the shared common resource; and
- determining if said common shared resource of the SMP computer system is needed by a pipeline operation; and
- rejecting the said pipeline operation if there is a conflict within the current cache line pipeline with the said remote cache line pipeline for said common shared resource of the computer system.

20. The SMP computer system according to claim 19 wherein said common shared resource includes a common address mux, and wherein said arbitrating for priority occurs in parallel to other resource operations.

* * * * *